United States Patent
Agarwal et al.

(10) Patent No.: US 11,947,916 B1
(45) Date of Patent: Apr. 2, 2024

(54) DYNAMIC TOPIC DEFINITION GENERATOR

(71) Applicant: Wells Fargo Bank, N.A., San Francisco, CA (US)

(72) Inventors: Amit Agarwal, Bangalore (IN); Dipanjan Deb, Bangalore (IN); Abhishek Kumar, Bengaluru (IN); Naveen Gururaja Yeri, Devarabeesanahalli (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 302 days.

(21) Appl. No.: 17/445,424

(22) Filed: Aug. 19, 2021

(51) Int. Cl.
| | | |
|---|---|---|
| *G06F 40/30* | (2020.01) | |
| *G06F 16/33* | (2019.01) | |
| *G06F 16/335* | (2019.01) | |
| *G06F 16/34* | (2019.01) | |
| *G06F 16/35* | (2019.01) | |
| *G06F 40/216* | (2020.01) | |
| *G06F 40/279* | (2020.01) | |
| *G06N 5/04* | (2023.01) | |
| *G06Q 50/00* | (2012.01) | |

(52) U.S. Cl.
CPC .......... *G06F 40/30* (2020.01); *G06F 16/3344* (2019.01); *G06F 16/335* (2019.01); *G06F 16/345* (2019.01); *G06F 16/35* (2019.01); *G06F 40/216* (2020.01); *G06F 40/279* (2020.01); *G06N 5/041* (2013.01); *G06Q 50/01* (2013.01)

(58) Field of Classification Search
CPC ...... G06F 40/30; G06F 40/279; G06F 16/345; G06F 16/35
See application file for complete search history.

(56) References Cited

U.S. PATENT DOCUMENTS

| | | | | |
|---|---|---|---|---|
| 6,963,830 | B1 * | 11/2005 | Nakao | G06F 16/345 |
| | | | | 715/255 |
| 2004/0225667 | A1 * | 11/2004 | Hu | G06F 16/345 |
| 2015/0046151 | A1 * | 2/2015 | Lane | G06F 16/358 |
| | | | | 704/9 |
| 2015/0081713 | A1 * | 3/2015 | Alonso | H04L 67/10 |
| | | | | 707/738 |
| 2015/0269153 | A1 * | 9/2015 | Fink | G06F 40/30 |
| | | | | 707/750 |
| 2016/0048511 | A1 * | 2/2016 | Bhagwat | G06F 16/313 |
| | | | | 707/755 |
| 2018/0032606 | A1 * | 2/2018 | Tolman | G06F 16/93 |
| 2019/0325066 | A1 * | 10/2019 | Krishna | G06F 16/3347 |
| 2020/0342019 | A1 * | 10/2020 | Manba | G06F 16/93 |
| 2021/0117617 | A1 * | 4/2021 | Blaya | G06F 40/253 |

* cited by examiner

*Primary Examiner* — Samuel G Neway
(74) *Attorney, Agent, or Firm* — SCHWEGMAN LUNDBERG & WOESSNER, P.A.

(57) ABSTRACT

Disclosed in some examples are methods, systems, and machine readable mediums which provide summaries of topics determined within a corpus of documents. These summaries may be used by customer service associates, analysts, or other users to quickly determine both topics discussed and contexts of those topics over a large corpus of text. For example, a corpus of documents may be related to customer complaints and the topics may be summarized to produce summaries such as "credit report update due to stolen identity." These summarizations may be used to efficiently spot trends and issues.

20 Claims, 5 Drawing Sheets

DYNAMIC TOPIC DEFINITION GENERATOR

TECHNICAL FIELD

Embodiments pertain to creating descriptive text for one or more topics. Some embodiments relate to using machine-learning to create descriptive text for one or more topics.

BACKGROUND

The information age has enabled widespread access to a large amount of information. While this is beneficial, it becomes difficult for people to digest the high volume of information in a short amount of time.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
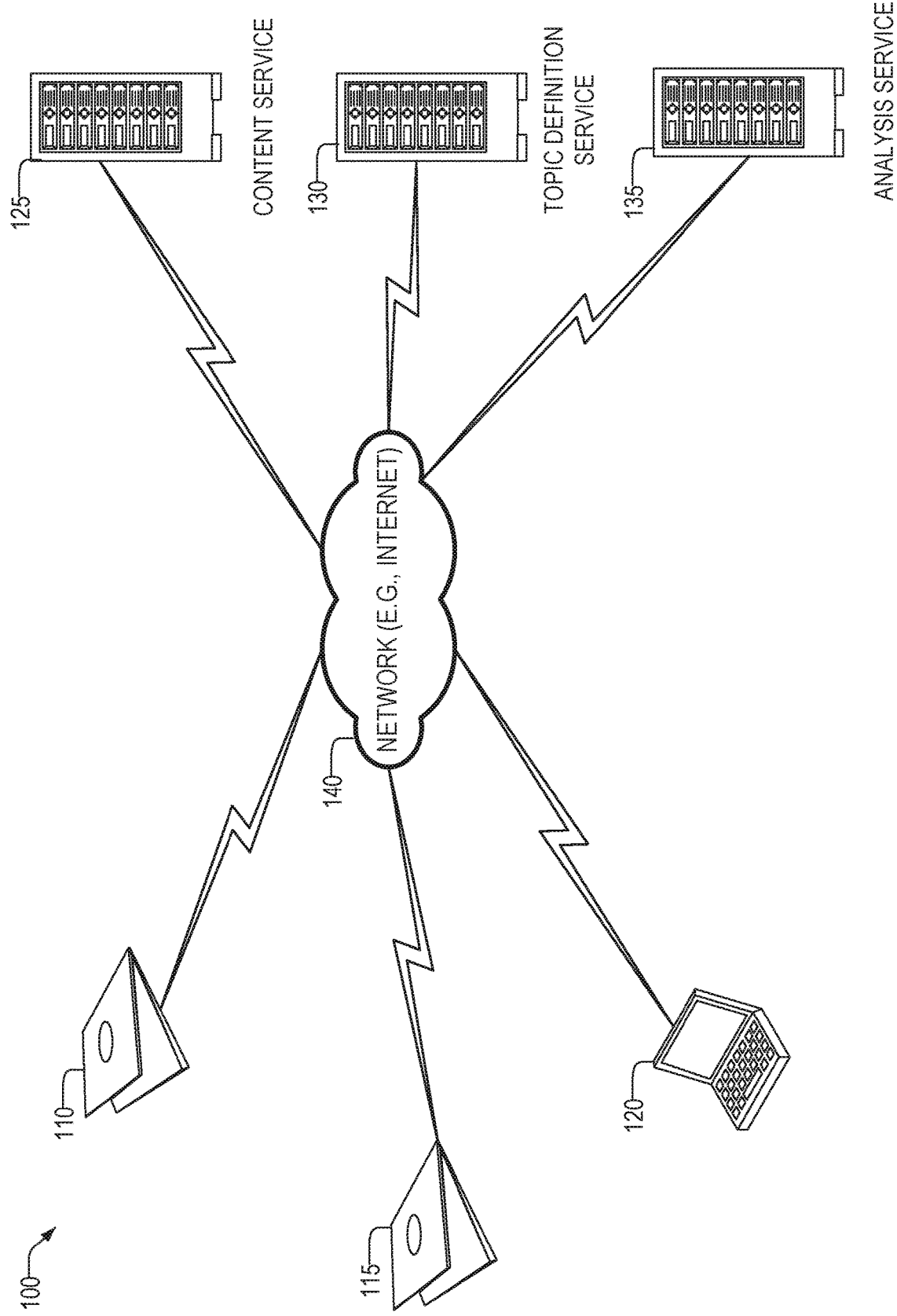
FIG. 1 illustrates a system according to some examples of the present disclosure.

Many activities require quickly interpreting high volumes of information. Tasks such as customer service analysts, complaint routing, fraud detection, and emergent topic analysis may all require rapid interpretation of high volumes of information. Customer service representatives may have to sort through a high volume of complaints from users submitted through official forms or scraped from Internet forums to detect problems with one or more products. Some failures are undetectable by automated analysis and so customer feedback is invaluable for identifying these failures. Delays in processing this data could mean a delay in recognizing a failure of a service and subsequent lost revenue from that service. In other fields, individuals seeking to determine trends in social media need to quickly process data due to the ephemeral nature of the trends. Delays in identification of these trends and topics on social media may reduce the usefulness of the identification. Trend analysis may be used to identify public relations issues, product defects, advertising opportunities, computing device outages, and the like.

Current systems may use natural language processing (NLP) or other algorithms such as Latent Dirichlet allocation (LDA) to produce topic terms discussed within a group of documents (called a corpus). The corpus may include a group of complaints, social media comments, or the like. While these topics may be useful on their own, the set of topics lack context and meaning. Because the topic terms lack context and meaning, additional analysis may be required to further derive useful information from just these topics. As this additional analysis takes time, additional optimizations would be beneficial to individuals needing a fast way of summarizing a large amount of data.

Disclosed in some examples are methods, systems, and machine readable mediums which provide topic sentences summarizing topics determined within a corpus of documents. These summaries may be used by customer service associates, analysts, or other users to quickly determine both topics discussed and contexts of those topics over a large corpus of text. For example, a corpus of documents may be related to customer complaints and the topics may be summarized to produce summaries such as "credit report update due to stolen identity." These summarizations may be used to efficiently spot trends and issues and to take action. For example, a topic summary matching or being close to one or more predetermined sentences may be used to automatically reconfigure one or more devices. For example, reboot a specified device when a topic sentence indicates that a network-based service is down.

In some examples, the system may first take a corpus of documents and determine a list of topic terms for a list of sentences within those documents. For example, the system may use the most frequently recited verbs, adjectives, and/or nouns; Latent Dirichlet Allocation (LDA); or other topic classifiers. The output may be a list of topic terms that may be cleaned up and/or processed by removing acronyms, articles, and other text that do not provide any information (e.g., "the"). The text information may then be separated into different contexts by topic modeling algorithms based upon similarities in the topic terms. Each context may be analyzed to find derivative topic words, such as stems (interest includes interesting, interested, etc. . . . ), synonyms (e.g., from a dictionary), and the like. Each topic term and the derivatives may then be sorted in each context based upon frequency. Topic terms that are below a threshold frequency may be removed. For each context, the topic terms may be used to create sentences based upon probability data from a document corpus (either the original corpus or a different corpus).

FIG. 1 illustrates a system 100 according to some examples of the present disclosure. Computing devices 110, 115, and 120 may access content service 125 over a network 140 and may generate a corpus of documents on a content service 125. Content service 125 may be a shopping service, a banking service, a social networking service, or any network-based service that provides services to computing devices over a network. The content service 125 may allow users to submit content such as complaints, social network posts, order histories (e.g., for online shopping services), and the like.

Topic definition service 130 may communicate with content service 125 to receive content generated by users of computing devices 110, 115, and 120. Topic definition service may take a corpus of documents and determine a list of topic terms for a list of sentences within those documents. For example, the system may use the most frequently recited verbs, adjectives, and/or nouns; Latent Dirichlet Allocation (LDA); or other topic classifiers. The output may be a list of topic terms that may be cleaned up and/or processed by removing acronyms, articles, and other text that do not provide any information (e.g., "the"). The text information may then be separated into different contexts by topic modeling algorithms based upon similarities in the topic terms. Each context is analyzed to find derivative topic words, such as stems (interest includes interesting, interested, etc. . . . ), synonyms (e.g., from a dictionary), and the like. Each topic term and the derivatives may be sorted in each context based upon frequency. Topic terms that are below a threshold frequency may be removed. For each context, the topic terms may be used to create sentences based upon probability data from a document corpus (either the original corpus or a different corpus).

The analysis service 135 may use the topic sentences from the topic definition service to provide an analysis of the corpus. For example, by displaying the topic sentences, creating one or more graphs, charts, or the like.

Figure 2:
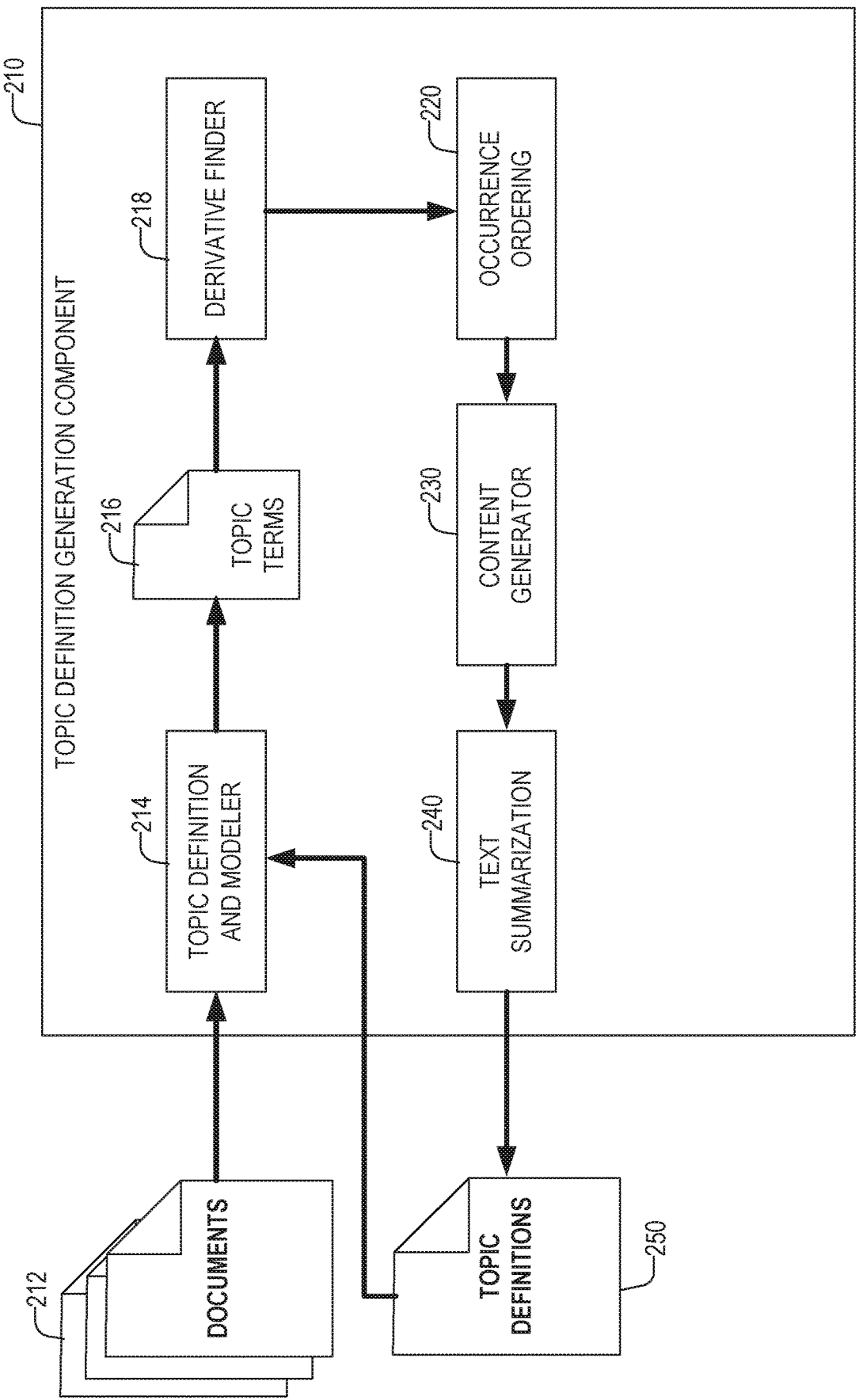
FIG. 2 illustrates a logical diagram of a topic definition generation component according to some examples of the present disclosure.

FIG. 2 illustrates a logical diagram of a topic definition generation component 210 according to some examples of the present disclosure. Topic definition and modeler component 214 may execute on one or more computing device of a topic definition service 130 according to some examples of the present disclosure. Document corpus 212 is analyzed by a topic definition and modeler component 214. The topic definition and modeler component 214 may use techniques such as LDA, NLP, Term Frequency—Inverse Document Frequency (TF-IDF), or other algorithms. In other examples the topic terms may comprise the most frequently recited verbs, adjectives, and/or nouns. Sentences in the corpus may then be separated into contexts by topic modeling algorithms such as LDA based upon similarities in topic terms for each sentence. In some examples, the contexts may be defined by adjacent sentences having similar topic terms. Similarity may be measured by TF-IDF scores, cosine similarity, Levenshtein distance or the like.

Topic terms 216 may be a list of topic terms for each of the contexts determined by the topic definition and modeler component 214. The topic terms 216 may be used by a derivative finder 218 to find derivative topic terms. For example, based upon word stems. That is, a topic may include "paid" and the stems may include "payment," "pay," and the like. The expanded list of topic terms 216 may be passed to the occurrence ordering component 220. The occurrence ordering component 220 may order the topic terms by frequency of occurrence in the document corpus 212. The occurrence ordering component 220 may remove topic terms that are below a threshold frequency of occurrence.

The resulting list of topic terms may be represented in a table such as:

| Context | Topic Term 1 | Topic Term 2 | Topic Term 3 | Topic Term 4 | Topic Term 5 |
|---|---|---|---|---|---|
| 1 | .035 "payment" | .017 "late" | .017 "account" | .016 "payments" | .016 "paid" |
| 2 | .038 "debt" | .016 "consumer" | .015 "company" | .012 "collection" | .09 "provide" |
| 3 | .108 "credit" | .083 "consumer" | .053 "report" | .036 "account" | .035 "information" |
| 4 | .037 "loan" | .025 "mortgage" | .015 "consumer" | .010 "would" | .010 "payments" |
| 5 | .052 "credit" | .041 "consumer" | .039 "accounts" | .036 "report" | .020 "account" |

Based upon the ordered list of topic terms, one or more topic definition sentences may be generated by the content generator 230. In some examples, the content generator 230 may use statistics about the positions of each of the topic terms within sentences of the document corpus 212. The content generator may use Natural Language Generation (NLG) algorithms to create a sentence from the topic terms by filling in words in-between the topic terms of a particular context. For example, the content generator may generate sentences from each of the topic terms by filling in words with a probabilistic prior and/or next word search from frequency information from the document corpus 212 or another corpus. In some examples, sequential contexts may be combined to create natural breaks in the sentences of the topic definition until a natural sentence is detected. For example, in the table above, the system may start with "payment" and fill in terms both before and after the word payment until a sentence is created (e.g., by coming to a word most frequently at the end of the sentence and a word most frequently at the beginning of the sentence) until we get to the term "late." The frequency information may be from the document corpus 212 or a different document corpus 212 (e.g., a bigger corpus). The system may do the same for the term "late", "account", "payments", and "paid" until we have one or more topic sentences for context 1. The system then repeats this for all other contexts. In some examples, a text summarization component 240 may summarize the topic sentences generated for each context—e.g., by combining the sentences for each of the contexts for each topic to produce one or more sentences for each topic to produce the topic definitions 250. In other examples, a machine-learning algorithm may use the topics to create a topic sentence. In some examples, the topic definitions may be fed back to the topic definition and modeler 214 as a feedback loop to increase a predictive capability of the topic definition and modeler for future document sets.

Figure 3:
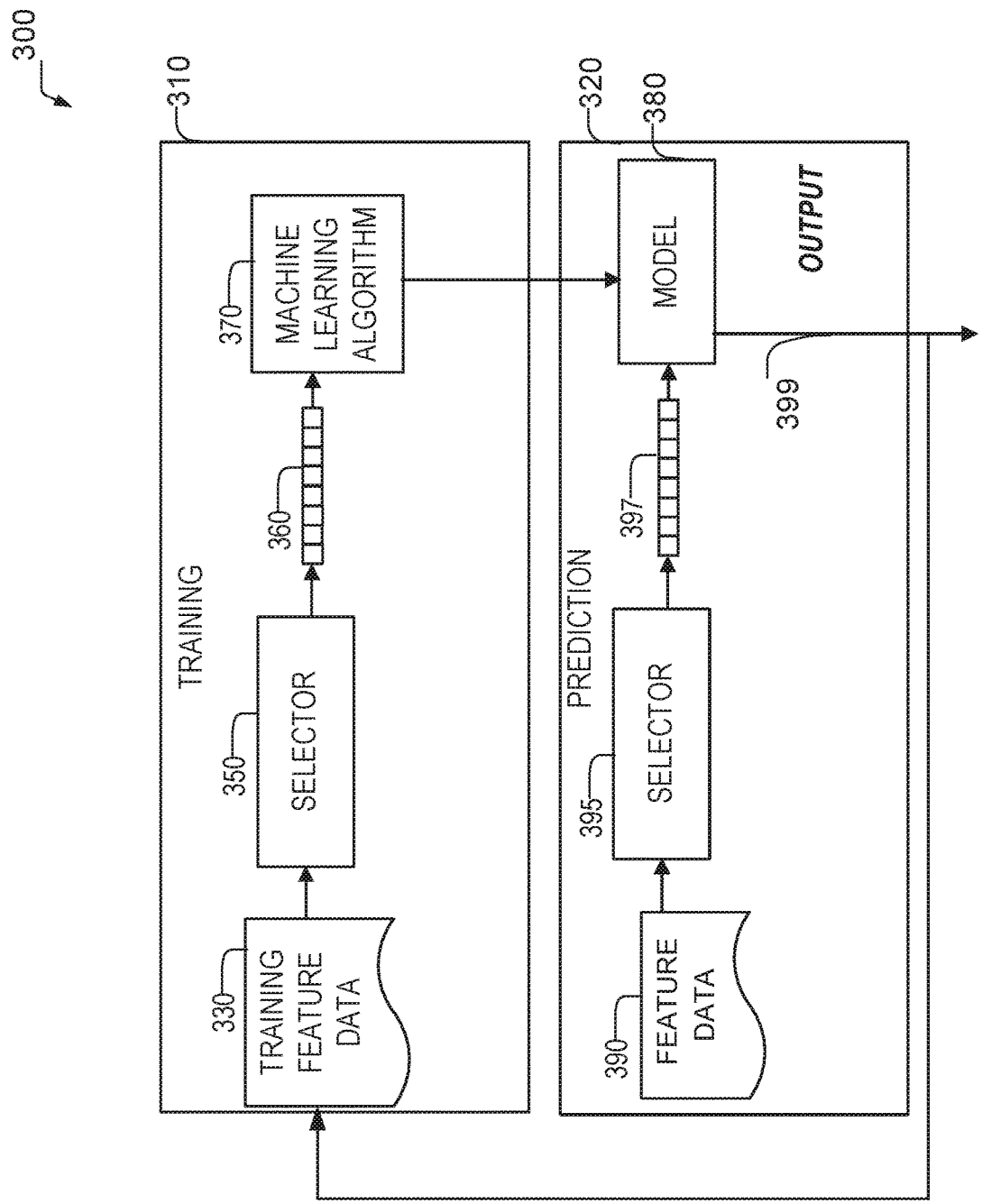
FIG. 3 illustrates an example machine learning module according to some examples of the present disclosure.

In some examples, machine learning may be used to identify topics, create topic sentences, and/or produce text summaries. FIG. 3 illustrates an example machine learning module 300 according to some examples of the present disclosure. The machine learning module 300 may be implemented in whole or in part by one or more computing devices. In some examples, the training module 310 may be implemented by a different device than the prediction module 320. In these examples, the model 380 may be created on a first machine and then sent to a second machine. One or more of modules 310 and 320 may be implemented by the topic definition generation component 210.

Machine learning module 300 utilizes a training module 310 and a prediction module 320. Training module 310 inputs training feature data 330 into selector module 850. The training feature data 330 may include a training corpus of documents. The training data 330 may be labeled with topics, topic sentences, and/or summaries of the corpus depending on the use of the machine-learning model. In other examples, the training data may not be labeled, and the model may be trained using feedback data—such as through a reinforcement learning method.

Selector module 350 selects training vector 360 from the training feature data 330. The selected data may fill training vector 360 and comprises a set of the training data that is determined to be predictive of topics, topic sentences, and/or summaries of the corpus (depending on the desired output of the machine-learning model). Information chosen for inclusion in the training vector 360 may be all the training feature data 330 or in some examples, may be a subset of all the training feature data 330. The training vector 360 may be utilized (along with any applicable labels) by the machine learning algorithm 370 to produce a model 380. In some examples, other data structures other than vectors may be used. The machine learning algorithm 370 may learn one or more layers of a model. Example layers may include convolutional layers, dropout layers, pooling/up sampling layers, SoftMax layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected.

In the prediction module 320, data 390 may be input to the selector module 395. The data 390 includes a corpus of documents such as customer complaints, fraud data, or the like. Selector module 395 may operate the same, or differently than selector module 350. In some examples, selector modules 350 and 395 are the same modules or different instances of the same module. Selector module 395 produces vector 397, which is input into the model 380 to produce an output such as an identification of topics, topic sentences, and/or summaries 399. For example, the weightings and/or network structure learned by the training module 310 may be executed on the vector 397 by applying vector 397 to a first layer of the model 380 to produce inputs to a second layer of the model 380, and so on until the output is reached. As previously noted, other data structures may be used other than a vector (e.g., a matrix).

The training module 310 may operate in an offline manner to train the model 380. The prediction module 320, however, may be designed to operate in an online manner. It should be noted that the model 380 may be periodically updated via additional training and/or user feedback. For example, additional training feature data 330 may be collected as users provide feedback on the output. The feedback, along with the data 390 corresponding to that feedback, may be used to refine the model by the training module 310. In some examples, the identification of topics, topic sentences, and/or summaries 399 may be used as feedback to retrain and refine the model 380.

The machine learning algorithm 370 may be selected from among many different supervised or unsupervised machine learning algorithms. Examples of learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, a region based CNN, a full CNN (for semantic segmentation), a mask R-CNN algorithm for instance segmentation, LDA models, and hidden Markov models. Examples of unsupervised learning algorithms include expectation-maximization algorithms, vector quantization, and information bottleneck method.

Figure 4:
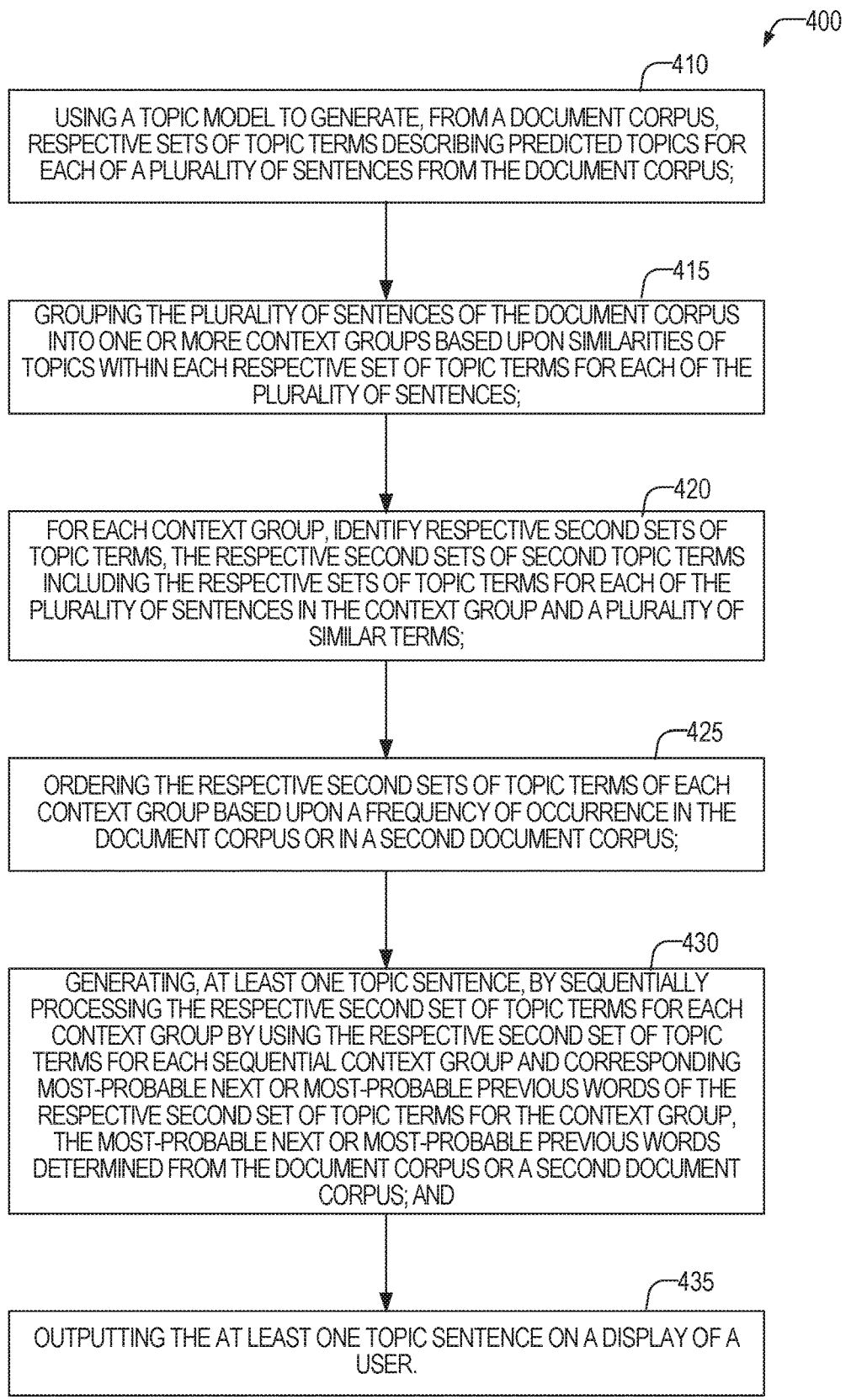
FIG. 4 illustrates a flowchart of a method of generating topic sentences from a corpus of documents according to some examples of the present disclosure.

FIG. 4 illustrates a flowchart of a method 400 of generating topic sentences from a corpus of documents according to some examples of the present disclosure. Method 400 may be performed by a computing device, such as a computing device at a topic definition service 130 or a computing device such as at a content service 125, analysis service 135, or computing devices 110, 115, and 120. At operation 410, the system may, using a topic model, generate from a document corpus, respective sets of topic terms describing predicted topics for each of a plurality of sentences from the document corpus. For example, the document corpus may include one or more free-text entry complaints, social media posts, fraud complaints, customer reviews, and the like. The document corpus may be received from a same system or a different system as the system executing method 400. For the purposes of method 400 multiple complaints, posts, or the like are concatenated into a single corpus.

At operation 415, the system may group the plurality of sentences of the document corpus into one or more context groups based upon similarities of topics within each respective set of topic terms for each of the plurality of sentences. For example, the system may identify sentences related to a same context of the topic words. Contexts may be identified using similarity of topics. Similarity of topics may be determined by reference to a dictionary with groups of similar topics or with a matrix of topics and similarity values. Topics grouped together in the dictionary or with a similarity score above a threshold may be identified as similar. Sentences may or may not be consecutive within the corpus. That is, a first sentence or document within the corpus may be grouped with a third sentences or document and the second sentence or document may be grouped with other sentences or documents that are not before or after it.

At operation 420, for each context group the system may identify respective second sets of topic terms, the respective second sets of second topic terms including the respective sets of topic terms for each of the plurality of sentences in the context group and a plurality of similar terms. For example, derivative words for the topic may be added to the sets. Derivative words may be words with a substantially same meaning. Examples include same word stems. Similar words may be determined based upon a lookup table. That is, for each possible topic word, a set of similar or derivative words may be included in the lookup table.

At operation 425, the system may order the respective second sets of topic terms of each context group based upon a frequency of occurrence in the document corpus or in a second document corpus. The document corpus could be the same document corpus from operation 410, or a different document corpus. For example, a larger document corpus may be used for the frequency information.

At operation 430, the system may generate at least one topic sentence by processing (e.g., sequentially) the respective second set of topic terms for each context group by using the respective second set of topic terms for each sequential context group and corresponding most-probable next or most-probable previous words of the respective second set of topic terms for the context group, the most-probable next or most-probable previous words determined from the document corpus or a second document corpus. For example, based upon the document corpus from operations 410, 425, or a different document corpus.

For example, a first topic word may be selected. The system may then determine using a probability model a next most probable word from the corpus. This word is then inserted into the sentence. In some examples this continues until the next most probable word is the most likely to end a sentence. In some examples, this process may also insert words before the topic term until the most probable term inserted is most likely to begin a sentence. In these examples, term positional information (e.g., where in a sentence the term is most likely to appear) is also used. In some examples, each topic term in a context is used to build a different sentence and then the sentences are summarized by a content summarization model to produce one or more topic definition sentences. In some examples, topic terms for sequential contexts may be combined to form sentences until a natural sentence break is detected.

At operation 435, the system may cause output of the at least one topic sentence on a display of a user. For example, the system may send the topic sentence to a terminal of a customer service representative to provide a summary of the current reported problems customers are facing.

In some examples, the topic sentences may be compared to one or more predefined topic sentences. If the topic sentences are similar to the predefined topic sentences, one or more automated actions may be taken. For example, if the one or more topic sentences is similar to a predefined sentence such as "the webpage is down," the system may automatically take actions to fix the problem. For example, sending one or more pings to one or more servers responsible for the service providing the webpage. If a server does not respond, it may be caused to be rebooted or a technician may be alerted. Similarity may be measured based upon a number of similar words and/or topics.

Figure 5:
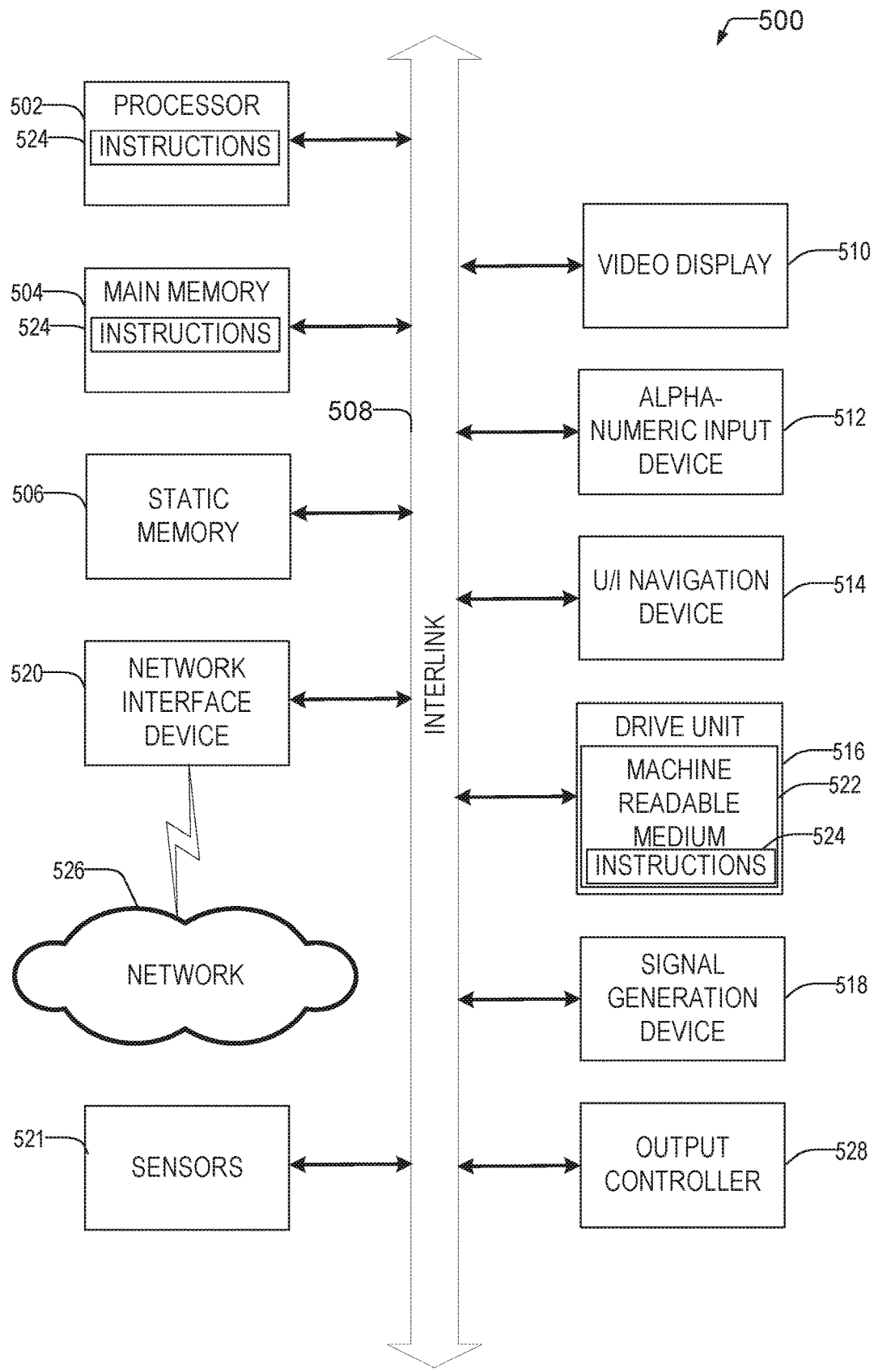
FIG. 5 is a block diagram illustrating an example of a machine upon which one or more embodiments may be implemented.

FIG. 5 illustrates a block diagram of an example machine 5000 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a server, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. For example, machine 500 may be a server for a content service 125, topic definition service 130, analysis service 135, or the like. Machine 500 may be a computing device 110, 115, or 120. Similarly, machine 500 may be configured to implement the topic definition generation component 210, training and/or prediction modules 310 and 320, and to perform method 400. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520. The Machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

Other Notes and Examples

Example 1 is a method comprising: using a topic model to generate, from a document corpus, respective sets of topic terms describing predicted topics for each of a plurality of sentences from the document corpus; grouping the plurality of sentences of the document corpus into one or more context groups based upon similarities of topics within each respective set of topic terms for each of the plurality of sentences; for each context group, identify respective second sets of topic terms, the respective second sets of second topic terms including the respective sets of topic terms for each of the plurality of sentences in the context group and a plurality of similar terms; ordering the respective second sets of topic terms of each context group based upon a frequency of occurrence in the document corpus or in a second document corpus; generating, at least one topic sentence, by processing the respective second set of topic terms for each context group by using the respective second set of topic terms for each sequential context group and corresponding most-probable next or most-probable previous words of the respective second set of topic terms for the context group, the most-probable next or most-probable previous words determined from the document corpus or a second document corpus; and outputting the at least one topic sentence on a display of a user.

In Example 2, the subject matter of Example 1 includes, wherein the document corpus comprises a plurality of free-text narratives, and wherein the method further comprises routing the topic sentence to a first computing device based upon the at least one topic sentence and a mapping between a plurality of topic sentences and computing devices.

In Example 3, the subject matter of Examples 1-2 includes, wherein the document corpus comprises social media posts and wherein the method further comprises: storing the at least one topic sentence; determining one or more topic trends of social media posts using previously determined topic sentences for previous time periods; and wherein outputting the at least one topic sentence on the display of the user comprises outputting topic trend data.

In Example 4, the subject matter of Examples 1-3 includes, wherein the topic model is a Latent Dirichlet Allocation generative statistical model.

In Example 5, the subject matter of Examples 1-4 includes, wherein the topic model is a Term Frequency—Inverse Document Frequency model.

In Example 6, the subject matter of Examples 1-5 includes, wherein the plurality of similar terms comprise a plurality of stems for each topic term in each respective set of topic terms for each of the plurality of sentences in the context group.

In Example 7, the subject matter of Examples 1-6 includes, applying a summarization model to summarize the topic sentence before outputting the topic sentence, the summarization model a Natural Language Programming (NLP) model.

Example 8 is a computing device comprising: a processor; a memory, the memory storing instructions, which when executed by the processor, cause the computing device to perform operations comprising: using a topic model to generate, from a document corpus, respective sets of topic terms describing predicted topics for each of a plurality of sentences from the document corpus; grouping the plurality of sentences of the document corpus into one or more context groups based upon similarities of topics within each respective set of topic terms for each of the plurality of sentences; for each context group, identify respective second sets of topic terms, the respective second sets of second topic terms including the respective sets of topic terms for each of the plurality of sentences in the context group and a plurality of similar terms; ordering the respective second sets of topic terms of each context group based upon a frequency of occurrence in the document corpus or in a second document corpus; generating, at least one topic sentence, by processing the respective second set of topic terms for each context group by using the respective second set of topic terms for each sequential context group and corresponding most-probable next or most-probable previous words of the respective second set of topic terms for the context group, the most-probable next or most-probable previous words determined from the document corpus or a second document corpus; and outputting the at least one topic sentence on a display of a user.

In Example 9, the subject matter of Example 8 includes, wherein the document corpus comprises a plurality of free-text narratives, and wherein the operations further comprise routing the topic sentence to a first computing device based upon the at least one topic sentence and a mapping between a plurality of topic sentences and computing devices.

In Example 10, the subject matter of Examples 8-9 includes, wherein the document corpus comprises social media posts and wherein the operations further comprise: storing the at least one topic sentence; determining one or more topic trends of social media posts using previously determined topic sentences for previous time periods; and wherein outputting the at least one topic sentence on the display of the user comprises outputting topic trend data.

In Example 11, the subject matter of Examples 8-10 includes, wherein the topic model is a Latent Dirichlet Allocation generative statistical model.

In Example 12, the subject matter of Examples 8-11 includes, wherein the topic model is a Term Frequency—Inverse Document Frequency model.

In Example 13, the subject matter of Examples 8-12 includes, wherein the plurality of similar terms comprise a plurality of stems for each topic term in each respective set of topic terms for each of the plurality of sentences in the context group.

In Example 14, the subject matter of Examples 8-13 includes, applying a summarization model to summarize the topic sentence before outputting the topic sentence, the summarization model a Natural Language Programming (NLP) model.

Example 15 is a non-transitory machine-readable medium, storing instructions, which when executed by a machine, causes the machine to perform operations comprising: using a topic model to generate, from a document corpus, respective sets of topic terms describing predicted topics for each of a plurality of sentences from the document corpus; grouping the plurality of sentences of the document corpus into one or more context groups based upon similarities of topics within each respective set of topic terms for each of the plurality of sentences; for each context group, identify respective second sets of topic terms, the respective second sets of second topic terms including the respective sets of topic terms for each of the plurality of sentences in the context group and a plurality of similar terms; ordering the respective second sets of topic terms of each context group based upon a frequency of occurrence in the document corpus or in a second document corpus; generating, at least one topic sentence, by processing the respective second set of topic terms for each context group by using the respective second set of topic terms for each sequential context group and corresponding most-probable next or most-probable previous words of the respective second set of topic terms for the context group, the most-probable next or most-probable previous words determined from the document corpus or a second document corpus; and outputting the at least one topic sentence on a display of a user.

In Example 16, the subject matter of Example 15 includes, wherein the document corpus comprises a plurality of free-text narratives, and wherein the operations further comprise routing the topic sentence to a first computing device based upon the at least one topic sentence and a mapping between a plurality of topic sentences and computing devices.

In Example 17, the subject matter of Examples 15-16 includes, wherein the document corpus comprises social media posts and wherein the operations further comprise: storing the at least one topic sentence; determining one or more topic trends of social media posts using previously determined topic sentences for previous time periods; and wherein outputting the at least one topic sentence on the display of the user comprises outputting topic trend data.

In Example 18, the subject matter of Examples 15-17 includes, wherein the topic model is a Latent Dirichlet Allocation generative statistical model.

In Example 19, the subject matter of Examples 15-18 includes, wherein the topic model is a Term Frequency—Inverse Document Frequency model.

In Example 20, the subject matter of Examples 15-19 includes, wherein the plurality of similar terms comprise a plurality of stems for each topic term in each respective set of topic terms for each of the plurality of sentences in the context group.

In Example 21, the subject matter of Examples 15-20 includes, applying a summarization model to summarize the topic sentence before outputting the topic sentence, the summarization model a Natural Language Programming (NLP) model.

Example 22 is a device comprising: means for using a topic model to generate, from a document corpus, respective sets of topic terms describing predicted topics for each of a plurality of sentences from the document corpus; means for grouping the plurality of sentences of the document corpus into one or more context groups based upon similarities of topics within each respective set of topic terms for each of the plurality of sentences; means for, for each context group, identify respective second sets of topic terms, the respective second sets of second topic terms including the respective sets of topic terms for each of the plurality of sentences in the context group and a plurality of similar terms; means for ordering the respective second sets of topic terms of each context group based upon a frequency of occurrence in the document corpus or in a second document corpus; means for generating, at least one topic sentence, by processing the respective second set of topic terms for each context group by using the respective second set of topic terms for each sequential context group and corresponding most-probable next or most-probable previous words of the respective second set of topic terms for the context group, the most-probable next or most-probable previous words determined from the document corpus or a second document corpus; and means for outputting the at least one topic sentence on a display of a user.

In Example 23, the subject matter of Example 22 includes, wherein the document corpus comprises a plurality of free-text narratives, and wherein the device further comprises means for routing the topic sentence to a first computing device based upon the at least one topic sentence and a mapping between a plurality of topic sentences and computing devices.

In Example 24, the subject matter of Examples 22-23 includes, wherein the document corpus comprises social media posts and wherein the device further comprises: means for storing the at least one topic sentence; means for determining one or more topic trends of social media posts using previously determined topic sentences for previous time periods; and wherein the means for outputting the at least one topic sentence on the display of the user comprises means for outputting topic trend data.

In Example 25, the subject matter of Examples 22-24 includes, wherein the topic model is a Latent Dirichlet Allocation generative statistical model.

In Example 26, the subject matter of Examples 22-25 includes, wherein the topic model is a Term Frequency—Inverse Document Frequency model.

In Example 27, the subject matter of Examples 22-26 includes, wherein the plurality of similar terms comprise a plurality of stems for each topic term in each respective set of topic terms for each of the plurality of sentences in the context group.

In Example 28, the subject matter of Examples 22-27 includes, means for applying a summarization model to summarize the topic sentence before outputting the topic sentence, the summarization model a Natural Language Programming (NLP) model.

Example 29 is at least one machine-readable medium including instructions that, when executed by processing circuitry, cause the processing circuitry to perform operations to implement of any of Examples 1-28.

Example 30 is an apparatus comprising means to implement of any of Examples 1-28.

Example 31 is a system to implement of any of Examples 1-28.

Example 32 is a method to implement of any of Examples 1-28.

What is claimed is:

1. A method comprising:
automatically, using a computing device:
retrieving a document corpus comprising problem reports of a network-based service;
using a topic model to generate, from the document corpus, respective sets of topic terms describing predicted topics for each of a plurality of sentences from the document corpus;
grouping the plurality of sentences of the document corpus into one or more context groups based upon similarities of topics within each respective set of topic terms for each of the plurality of sentences;
for a first context group of the one or more context groups, identify a second set of topic terms, the second set of second topic terms including the set of topic terms for each of the plurality of sentences in the first context group and a plurality of similar terms;
ordering the second set of topic terms of the first context group based upon a frequency of occurrence in the document corpus or in a second document corpus;
generating, at least one topic sentence, by processing the second set of topic terms for the first context group by using the second set of topic terms and corresponding most-probable next or most-probable previous words of the second set of topic terms for the first context group, the most-probable next or most-probable previous words determined from the document corpus or the second document corpus;
comparing the at least one topic sentence to one or more predefined topic sentences that indicate a problem with the network-based service; and
based upon the comparison of the at least one topic sentence to the one or more predefined topic sentences, performing at least one automated action on a computing device corresponding to the network-based service to fix the problem.

2. The method of claim 1, wherein the document corpus comprises a plurality of free-text narratives, and wherein the method further comprises routing the topic sentence to a first computing device based upon the at least one topic sentence and a mapping between a plurality of topic sentences and computing devices.

3. The method of claim 1, wherein the document corpus comprises social media posts and wherein the method further comprises:
storing the at least one topic sentence;
determining one or more topic trends of social media posts using previously determined topic sentences for previous time periods; and
outputting topic trend data on a display of a user.

4. The method of claim 1, wherein the topic model is a Latent Dirichlet Allocation generative statistical model.

5. The method of claim 1, wherein the topic model is a Term Frequency—Inverse Document Frequency model.

6. The method of claim 1, wherein the plurality of similar terms comprise a plurality of stems for each topic term in each respective set of topic terms for each of the plurality of sentences in the context group.

7. The method of claim 1, further comprising:
applying a summarization model to summarize the topic sentence before outputting the topic sentence, the summarization model a Natural Language Programming (NLP) model.

8. A computing device comprising:
a processor;
a memory, the memory storing instructions, which when executed by the processor, cause the computing device to perform operations comprising:
automatically:
retrieving a document corpus comprising problem reports of a network-based service;
using a topic model to generate, from the document corpus, respective sets of topic terms describing predicted topics for each of a plurality of sentences from the document corpus;
grouping the plurality of sentences of the document corpus into one or more context groups based upon similarities of topics within each respective set of topic terms for each of the plurality of sentences;
for a first context group of the one or more context groups, identify a second set of topic terms, the second set of second topic terms including the set of topic terms for each of the plurality of sentences in the first context group and a plurality of similar terms;
ordering the second set of topic terms of the first context group based upon a frequency of occurrence in the document corpus or in a second document corpus;
generating, at least one topic sentence, by processing the second set of topic terms for the first context group by using the second set of topic terms and corresponding most-probable next or most-probable previous words of the second set of topic terms for the first context group, the most-probable next or most-probable previous words determined from the document corpus or a second document corpus;
comparing the at least one topic sentence to one or more predefined topic sentences that indicate a problem with the network-based service; and
based upon the comparison of the at least one topic sentence to the one or more predefined topic sentences, performing at least one automated action on a computing device corresponding to the network-based service to fix the problem.

9. The computing device of claim 8, wherein the document corpus comprises a plurality of free-text narratives, and wherein the operations further comprise routing the topic sentence to a first computing device based upon the at least one topic sentence and a mapping between a plurality of topic sentences and computing devices.

10. The computing device of claim 8, wherein the document corpus comprises social media posts and wherein the operations further comprise:
storing the at least one topic sentence;
determining one or more topic trends of social media posts using previously determined topic sentences for previous time periods; and
outputting topic trend data on a display of a user.

11. The computing device of claim 8, wherein the topic model is a Latent Dirichlet Allocation generative statistical model.

12. The computing device of claim 8, wherein the topic model is a Term Frequency —Inverse Document Frequency model.

13. The computing device of claim 8, wherein the plurality of similar terms comprise a plurality of stems for each topic term in each respective set of topic terms for each of the plurality of sentences in the context group.

14. The computing device of claim 8, further comprising:
applying a summarization model to summarize the topic sentence before outputting the topic sentence, the summarization model a Natural Language Programming (NLP) model.

15. A non-transitory machine-readable medium, storing instructions, which when executed by a machine, causes the machine to perform operations comprising:
automatically;
retrieving a document corpus comprising problem reports of a network-based service:
using a topic model to generate, from the document corpus, respective sets of topic terms describing predicted topics for each of a plurality of sentences from the document corpus:
grouping the plurality of sentences of the document corpus into one or more context groups based upon similarities of topics within each respective set of topic terms for each of the plurality of sentences;
for a first context group of the one or more context groups, identify a second set of topic terms, the second set of second topic terms including the set of topic terms for each of the plurality of sentences in the first context group and a plurality of similar terms;
ordering the second set of topic terms of the first context group based upon a frequency of occurrence in the document corpus or in a second document corpus;
generating, at least one topic sentence, by processing the respective second set of topic terms for the first context group by using the second set of topic terms and corresponding most-probable next or most-probable previous words of the second set of topic terms for the first context group, the most-probable next or most-probable previous words determined from the document corpus or a second document corpus;

comparing the at least one topic sentence to one or more predefined topic sentences that indicate a problem with the network-based service; and
based upon the comparison of the at least one topic sentence to the one or more predefined topic sentences, performing at least one automated action on a computing device corresponding to the network-based service to fix the problem.

16. The non-transitory machine-readable medium of claim 15, wherein the document corpus comprises a plurality of free-text narratives, and wherein the operations further comprise routing the topic sentence to a first computing device based upon the at least one topic sentence and a mapping between a plurality of topic sentences and computing devices.

17. The non-transitory machine-readable medium of claim 15, wherein the document corpus comprises social media posts and wherein the operations further comprise:
storing the at least one topic sentence;
determining one or more topic trends of social media posts using previously determined topic sentences for previous time periods; and
outputting topic trend data on a display of a user.

18. The non-transitory machine-readable medium of claim 15, wherein the topic model is a Latent Dirichlet Allocation generative statistical model.

19. The non-transitory machine-readable medium of claim 15, wherein the topic model is a Term Frequency—Inverse Document Frequency model.

20. The non-transitory machine-readable medium of claim 15, wherein the plurality of similar terms comprise a plurality of stems for each topic term in each respective set of topic terms for each of the plurality of sentences in the context group.

* * * * *